United States Patent [19]

Hasegawa

[11] Patent Number: 5,277,270
[45] Date of Patent: Jan. 11, 1994

[54] VEHICLE TRANSAXLE SUPPORT

[75] Inventor: Toshiyuki Hasegawa, Ashiya, Japan

[73] Assignee: Kanzaki Kokyukoki Mfg. Co., Ltd., Inadera, Japan

[21] Appl. No.: 805,073

[22] Filed: Dec. 11, 1991

[30] Foreign Application Priority Data

Dec. 26, 1990 [JP] Japan ............................ 2-406929[U]

[51] Int. Cl.$^5$ .............................................. B60K 17/00
[52] U.S. Cl. .................................. 180/378; 180/291; 180/312
[58] Field of Search ............... 180/377, 378, 311, 312, 180/291, 298, 299

[56] References Cited

U.S. PATENT DOCUMENTS

| | | | |
|---|---|---|---|
| 3,604,527 | 9/1971 | Price | 180/378 |
| 4,402,380 | 9/1983 | Strong | 100/312 |
| 4,629,211 | 12/1986 | Modglin et al. | 180/312 |
| 4,691,802 | 9/1987 | Ishimori et al. | 180/291 |
| 4,746,145 | 5/1988 | Furuichi et al. | 180/312 |
| 4,850,448 | 7/1989 | Stephens | 180/312 |

FOREIGN PATENT DOCUMENTS 61-127026 8/1986 Japan .
6326440 2/1988 Japan .

Primary Examiner—Kenneth R. Rice
Attorney, Agent, or Firm—Tilton, Fallon, Lungmus

[57] ABSTRACT

In a vehicle comprising a transaxle (2) which is fixedly attached at its left and right axle casings (5) to left and right body frame members (1), a mechanism for preventing the transaxle from being rotationally displaced about wheel axles (4) is provided. The mechanism comprises a rotation-preventing beam (6), fixedly provided to the frame members, and engaging projections (7, 8) fixedly disposed on a transmission casing (3) of the transaxle. Attachment portions of the body frame for the transaxle are well prevented from being deformed so that no substantial inclination of the transaxle is caused.

4 Claims, 3 Drawing Sheets

VEHICLE TRANSAXLE SUPPORT

FIELD OF THE INVENTION

This invention relates to a support structure for transaxles employed in vehicles such as tractors and the like. More particularly, the present invention relates to a transaxle support structure adapted for use in a vehicle in which a vehicle body frame has left and right frame members.

BACKGROUND OF THE INVENTION

In a vehicle comprising a transaxle which is powered by an engine through a transmission shaft and drives vehicle drive wheels to rotate, the transaxle is subjected to a reaction torque which is caused by the ground reacting against the rotation of the drive wheels. Such reaction torque tends to rotationally displace the transaxle about the axles of drive wheels so that portions of the vehicle body frame at which the transaxle is attached to the frame tend to be deformed to result in an inclined posture of the transaxle. In case where such inclined posture of transaxle is caused in a vehicle having a shaft-jointing structure where a universal joint is employed only between the transmission shaft set forth above and either of an engine output shaft or an input shaft of the transaxle, or in a vehicle having a shaft-jointing structure where the transmission shaft for connecting the engine output shaft and transaxle input shaft is jointed to both of these shafts using rubber joints, variation in angular velocity is caused at the joint or joints so that an unstable condition of rotational speed of the transaxle input shaft is caused whereby a variation in the travelling speed of vehicle is resulted.

As shown, for example, in JP, U No.61-127026, one of the conventional structures for avoiding such disadvantage is that a transaxle is fixedly secured to a vehicle body frame using a plurality of bolts extending in plural directions, namely lateral, vertical and logitudinal directions of a vehicle, so as to provide a support structure rigid enough to prevent the transaxle from being changed in posture. As shown, for example, in JP, U No.63-26440, another structure according to the prior art, is that two universal joints are employed so that no problem in power transmission from an engine to a transaxle may be caused even when the transaxle is changed in its posture. When the latter structure is employed, a transaxle is, in general, fixedly attached at its left and right axle casings to left and right frame members of a vehicle body frame.

Of the two prior art structures set forth above, the former one of providing a rigid support structure for the transaxle requires a lot of tapping operations, bolts, and assembling operations so that it is expensive. The latter structure of employing two universal joints is still expensive due to the use of two universal joints of a relatively large cost and may cause, when the posture of transaxle is varied, deviation in timing or unsmoothness with regard to the operation of a control mechanism for a speed change gearing or the like provided in the transaxle.

Accordingly, a primary object of the present invention is to provide an improved transaxle-supporting structure which eliminates these problems of the prior art structures.

BRIEF DESCRIPTION OF THE DRAWINGS

Other objects and advantages of the invention will become readily apparent as the specification is considered in conjunction with the accompanying drawings in which.

SUMMARY OF THE INVENTION

Figure 1:
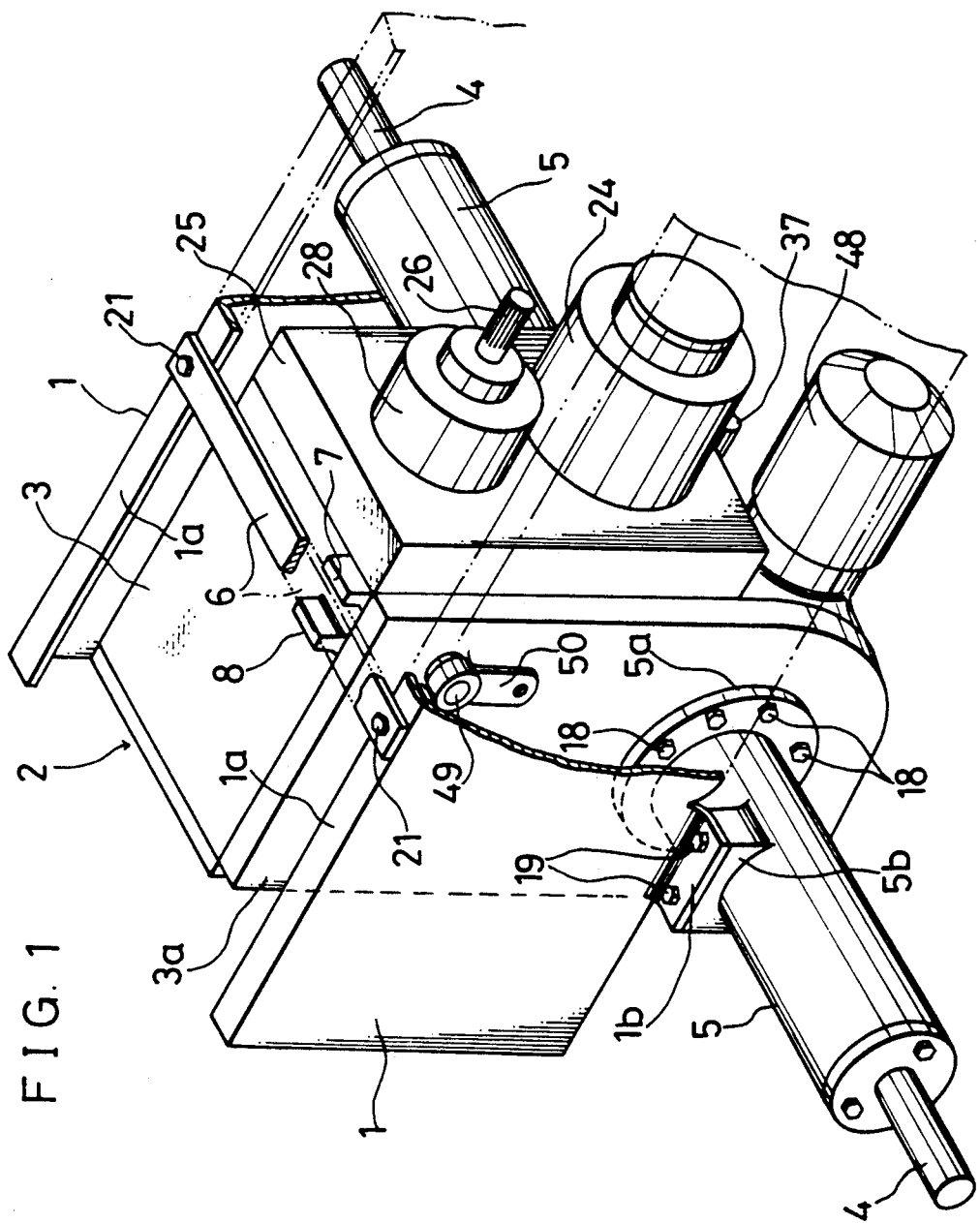
FIG. 1 is a schematic perspective view, partially cut away, of an embodiment of the transaxle supporting structure according to the present invention.

The present invention relates to a transaxle supporting structure adapted for use in a vehicle which comprises, as shown in the accompanying drawings, a body frame having left and right frame members 1, and a transaxle 2 having a transmission casing 3 and left and right axle casings 5 for housing left and right wheel axles 4. The transaxle 2 is fixedly attached at its left and right axle casings 5 to the left and right frame members 1 of vehicle body frame.

The transaxle supporting structure according to the present invention comprises a rotation-preventing means 6 which is fixedly provided to the vehicle body frame, and an engaging means 7, 8 which is fixedly disposed on the transmission casing 3 and is operable to engage the rotation-preventing means 6 so as to prevent a rotational displacement of the transaxle 2 about the wheel axles 4.

In a preferred embodiment of the present invention, the rotation-preventing means is fashioned to comprise a rotation-preventing beam 6 which is bridged between the left and right frame members 1, while the engaging means is fashioned to comprise a pair of engaging projections 7 and 8 which are disposed on the transmission casing 3 so as to be engageable with the rotation-preventing beam 6.

When a reaction torque is applied to the transaxle 2 from the rotating drive wheels during a travel of the vehicle so that the transaxle tends to be rotated about the wheel axles 4, such rotational displacement of the transaxle 2 is prevented owing to the engagement of engaging means or one of the engaging projections 7 and 8 on the transmission casing 3 with the rotation-preventing means or beam 6 which is fixedly provided to the vehicle body frame. Consequently, portions of the frame members 1 at which the left and right axle casings 5 are attached to the body frame are prevented from being deformed so that an inclined posture of the transaxle 2 is not caused.

The transaxle supporting mechanism according to the present invention, comprising the rotation-preventing means and engaging means which are operable so as to prevent a rotational displacement of the transaxle by an engagement therebetween, is simple in structure and may be provided with a low manufacturing cost. Although the rotation-preventing beam 6 shown may be substituted with other element or elements with which the engaging means on the transmission casing is engageable, as will be detailed later, this beam 6 which is bridged between the left and right frame members 1 is advantageous because it also acts as a reinforcement element for the vehicle body frame.

In a further preferred embodiment of the present invention, the pair of engaging projections 7 and 8 are formed integral with an outer wall of the transmission casing 3 so as to provide between them a recess through which the rotation-preventing beam 6 extends. The engaging projections 7 and 8 which are integral with the transmission casing or an outer wall of it will contribute to enhancing rigidity of the transaxle supporting structure and can be formed at the same time when transmission casing is formed by casting. The recess between the pair of engaging projections 7 and 8 acts as a positioning means for the beam 6 relative to the engaging projections.

In another preferred embodiment of the present invention, the pair of engaging projections 7 and 8 are disposed on a top wall of the transmission casing 3 and the rotation-preventing beam 6 is disposed so that it extends along and across an outer surface of the top wall of casing 3. This arrangement makes the engaging projections 7 and 8 remote from the wheel axles 4 so that length of the moment or torque arm between the projections and axles is made large. Consequently, load or force applied to the engaging projections and to the beam 6 when the transaxle 2 is subjected to a reaction torque of rotationally displacing same about the axles will be made small so that small-sized beam 6 and projections 7 and 8 may be satisfactory for securing a rigidity and not be damaged.

DESCRIPTION OF A PREFERRED EMBODIMENT

Figure 2:
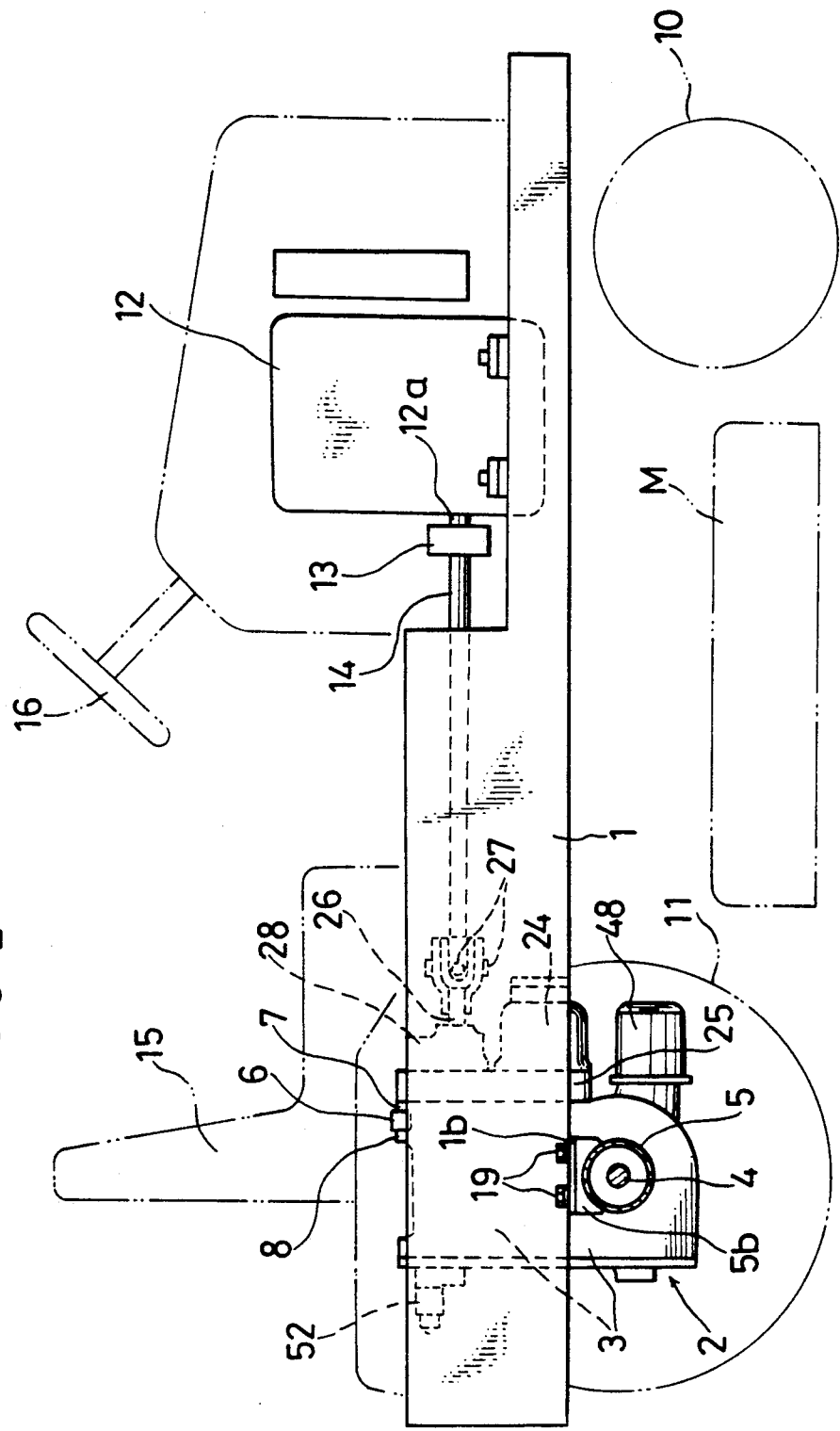
FIG. 2 is a schematic side view of a mower tractor in which the transaxle supporting structure shown in FIG. 1 is employed.

A mower tractor is shown in FIG. 2 in which a preferred embodiment of the transaxle supporting structure according to the present invention is employed. The tractor is equipped with a mid-mount mower M at an underside of the vehicle and between pairs of left and right front wheels 10 and rear wheels 11. An engine 12 is mounted on a front portion of the vehicle, and the transaxle 2 referred to before is disposed between the left and right rear wheels 11 so as to provide vehicle-travelling rotation to the rear wheels. To an output shaft 12a of engine 12 is coupled, using a rubber joint 13, a transmission shaft 14 which extends longitudinally of the vehicle and supplies power to the transaxle 2. An operator's seat 15 is disposed above the transaxle 2, and a steering wheel 16 for operating the left and right front wheels 10 to turn is located before the seat 15.

As shown in FIG. 1, each of the left and right frame members 1 referred to before is composed of an elongated plate material having at its upper end an inwardly projecting flange 1a. The left and right frame members 1 are connected to each other by a suitable number of cross beams (not shown) so as to form an elongated vehicle body frame which extends, as shown in FIG. 2, longitudinally of the vehicle.

Figure 3:
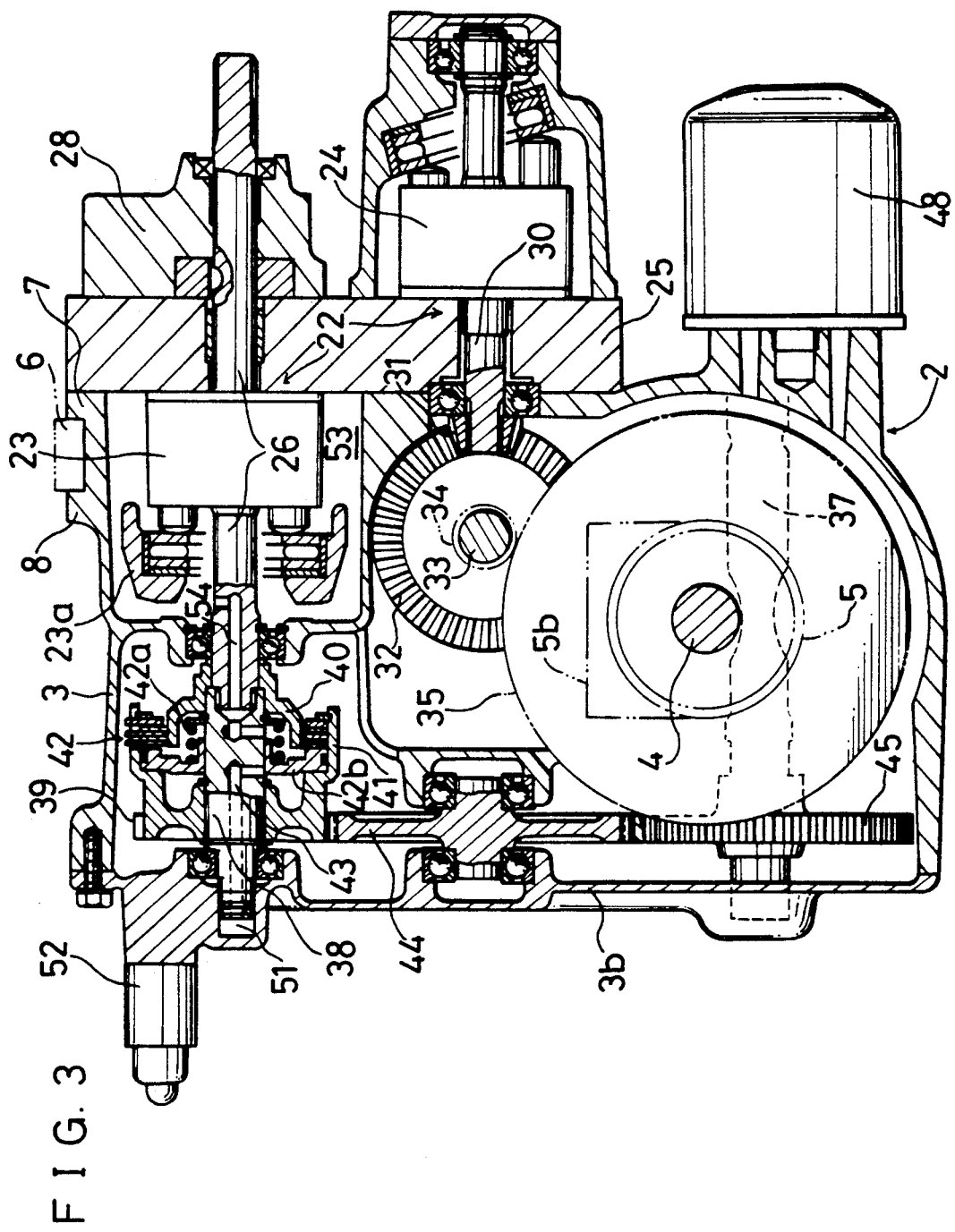
FIG. 3 is a sectional side view of the transaxle shown in FIG. 1.

As shown in FIG. 1 with respect to the axle casing 5 of one side, each axle casing 5 has at its base end an integral flange 5a at which it is fixedly attached to the transmission casing 3 using bolts 18. The axle casing of one side is attached to the transmission casing at a side cover 3a of this casing 3 which closes a side opening (not shown) of the transmission casing. In addition, it should be understood that one or both of the axle casings 5 may be formed integral with the transmission casing 3. As shown in FIGS. 1 to 3, each axle casing 5 has near its base end and at its upper side an integral mounting boss or pad 5b. As shown in FIG. 1, each frame member 1 has at its lower end an attaching flange 1b, extending laterally outwardly from the frame member, which is seated on the upper surface of mounting pad 5b and is fastened to the pad using bolts 19 so as to attach each axle casing 5 to each frame member 1 and to thereby attach the transaxle 2 fixedly to the vehicle body frame.

As shown in FIG. 1, the rotation-preventing beam 6 set forth before is composed of an elongated plate material, extends along and across an outer surface of a top wall of the transmission casing 3 and is fixedly secured at its both ends to the flanges 1a of left and right frame members 1 using bolts 21. The pair of engaging projections 7 and 8 set forth before are formed on the top wall of the transmission casing 3 integrally with the top wall so that these projections 7 and 8 are in face-to-face relationship with each other in the longitudinal direction of vehicle with a recess therebetween through which recess the beam 6 extends. The engaging projections 7 and 8 may be disposed such that they are apart from each other in the lateral direction of vehicle. One and the other projections 7 and 8 operate in cooperation with the beam 6 to prevent a rotational displacement of the transaxle 2 about the wheel axles 4 into one and the other directions, respectively.

Although the structure shown is believed to be the best one, many variations or changes may be made. By way of example, the pair of engaging projections 7 and 8 shown may be replaced by a single engaging projection having a lateral thorough bore through which the rotation-preventing beam 6 fittingly extends. Also, a rotation-preventing beam bridged between the left and right frame members 1 may be employed which has a vertical thorough bore through which a single engaging projection on the transmission casing 3 fittingly extends. In place of the rotation-preventing beam 6 shown which is bridged between the left and right frame members 1, one or two rotation-preventing projection(s), which is/are formed integral with one or both of the left and right frame members 1 so as to project laterally inwardly, may be employed in a fashion such that this or these rotation-preventing projection(s) is/are engagingly sandwiched between a pair or two pairs of engaging projections on the transmission casing 3.

As shown in FIG. 3, the transaxle 2 shown comprises a hydrostatic transmission 22 composed of a combination of a hydraulic pump 23 of the variable displacement type and a hydraulic motor 24 of the fixed displacement type. A plate member 25 of a relatively large thickness is fixedly attached to a front surface of the transmission casing 3. The hydraulic pump 23 is mounted on a rear surface of an upper half of the plate member 25 so that it is disposed within the transmission casing 3 at a front and upper portion of the inside of this casing, whereas the hydraulic motor 23 is mounted on a front surface of a lower half of the plate member 25 so that it is disposed at an outside of the transmission casing 3. Pump shaft 26 of the hydraulic pump 23 extends forwardly of the plate member 25 and is connected, as shown in FIG. 2, to the transmission shaft 14 using a universal joint 27. A charge pump 28 for supplementing fluid to the hydrostatic transmission 22 is fashioned to a trochoidal pump by using as its pump shaft the above-mentioned pump shaft 26 and is mounted on a front surface of the plate member 25.

As also shown in FIG. 3, motor shaft 30 of the hydraulic motor 24 extends through the plate member 25 into the transmission casing 3 and fixedly carries a bevel pinion 31 spline-fitted on it. A transmission shaft 33 having on it a bevel gear 32 meshing with the bevel pinion 31 extends laterally at a level below the hydraulic pump 23 within the transmission casing 3. Within the transmission casing 3 and between the left and right wheel axles 4 is disposed a differential gearing (not shown) which has an input spur gear 35 of a relatively large diameter which is meshed with a smaller spur gear 34 fixedly mounted on the transmission shaft 33.

For driving the mower M shown in FIG. 2, a mid-PTO shaft 37 is provided which extends, as shown in FIG. 1, forwardly from the transmission casing 3 at a level below the plate member 25. As shown in FIG. 3, this mid-PTO shaft 37 is disposed at a low level within the transmission casing 3 and is driven to rotate by the pump shaft 26 of the hydraulic pump 23 through a transmission mechanism which will be detailed hereinafter. As also shown in FIG. 3, the pump shaft 26 extends rearwardly of the hydraulic pump 23. A drive shaft 38 having on it a corotatable gear 39 is disposed co-axially with and behind the pump shaft 26. Between these shafts 26 and 38 is disposed a PTO-clutch 42 of a frictional disc type comprising opposite sets of frictional elements which are slidably but non-rotatably supported by a rotatable support member 40, fixedly mounted on the pump shaft 26, and by a clutch housing 41 formed interal with the boss portion of gear 39. This PTO-clutch 42 is fashioned to a fluid-operated type and comprises an annular piston 42b which is disposed within the clutch housing 41 and is biased to move away from the frictional elements by a return spring 42a. The clutch 42 is engaged by fluid under pressure, supplied through a fluid passage 43 in the drive shaft 38, which causes the piston 42b to move toward the frictional elements against the biasing force of return spring 42a. Gear 39 is adapted to drive a gear 45, fixedly mounted on a rear end portion of the mid-PTO shaft 37, to rotate through an intermediate gear 44. Consequently, the mid-PTO shaft 37 is driven to rotate by the pump shaft 26 at an engaged condition of the PTO-clutch 42.

As is usual, a lower portion of the transmission casing 3 is utilized as a fluid or oil tank from which oil is fed to the charge pump 28 by the operation of this pump through an oil filter 48 which is mounted on a front surface of the transmission casing 3 at a level below the plate member 25. Fluid passages and valves (not shown) for the hydrostatic transmission 22 are disposed within the plate member 25. The hydraulic pump 23 has a swash plate 23a, shown in FIG. 3, the inclination of which is varied or controlled for a speed-change purpose through a control arm 50 which is secured, as shown in FIG. 1, to a swash plate control shaft 49 extending through the side cover 3a of the transmission casing 3. Charge pump 28 is also used for supplying fluid to the PTO-clutch 42, and an electromagnetic control valve 52 mounted on a rear end cover 3b of the transmission casing 3 is provided which is incorporated in a fluid passage (not shown) for supplying fluid from the charge pump 28 to a fluid chamber 51 which is formed within the rear end cover 3b and is communicated with the fluid passage 43 in the drive shaft 38. As shown in FIG. 3, the hydraulic pump 23 is disposed within a chamber 53 which is defined within the transmission casing 3 so as to be filled with cooling oil. An oil passage 54 is formed in the pump shaft 26 for supplying lubricant oil from the chamber 53 to the frictional elements of the PTO-clutch 42.

The mower tractor shown is used for mowing in an engaged condition of the PTO-clutch 42 where the mower M is driven through the mid-PTO shaft 42. During such mowing operation, the travelling speed of vehicle may be changed in a non-stepwise manner with a selective reversing of travelling direction by means of the hydrostatic transmission 22. Because the transaxle 2 is prevented from being rotationally displaced about the wheel axles 4 by the support mechanism according to the present invention, the attaching flanges 1b of frame members 1 are well prevented from being deformed so that no inclined posture of the transaxle 2 is caused. Consequently, the shaft-jointing structure shown in FIG. 2 in which a rubber joint 13 is employed at one end of the transmission shaft 14 for transmitting power from engine 12 to the transaxle 2 will not cause any trouble in transmitting power. Further, there is caused no deviation in position of a connecting mechanism for operatively connecting the control arm 50 shown in FIG. 1 to a speed change lever or pedal (not shown) for operating the pump swash plate 23a (FIG. 3) so that the swash plate is operated or controlled in a predetermined proper timing.

I claim:

1. In a vehicle which comprises a body frame having left and right frame members; and a transaxle having a transmission casing and left and right axle casings fixedly secured to said transmission casing for housing left and right wheel axles, said transaxle being fixedly attached at said left and right axle casings to said left and right frame members, the improvement which comprises:
    rotation-preventing means (6) fixedly provided to said body frame, said rotation-preventing means extending generally laterally of said transmission casing (3); and
    engaging means (7, 8) fixedly disposed on an outer surface of said transmission casing (3) and being operable to engage said rotation-preventing means so as to prevent a rotational displacement of said transaxle (2) about said wheel axles (4).

2. The structure according to claim 1, wherein said rotation-preventing means comprises a rotation-preventing beam (6) bridged between said left and right frame members (1), and wherein said engaging means comprises a pair of engaging projections (7, 8) on said transmission casing (3) engageable with said rotation-preventing beam (6).

3. The structure according to claim 2, wherein said pair of engaging projections (7, 8) are formed integral with an outer wall of said transmission casing (3) so as to provide a recess between said projections, said rotation-preventing beam (6) extending through said recess between said projections (7, 8).

4. The structure according to claim 2 or 3, wherein said pair of engaging projections (7, 8) are disposed on a top wall of said transmission casing (3), said rotation-preventing beam (6) extending along and across an outer surface of said top wall.

* * * * *